(12) United States Patent
Hirth et al.

(10) Patent No.: US 9,121,345 B2
(45) Date of Patent: Sep. 1, 2015

(54) TURBINE FOR AN EXHAUST TURBOCHARGER OF AN INTERNAL COMBUSTION ENGINE

(71) Applicant: DAIMLER AG, Stuttgart (DE)

(72) Inventors: Torsten Hirth, Rutesheim (DE); Siegfried Sumser, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 141 days.

(21) Appl. No.: 13/897,400

(22) Filed: May 18, 2013

(65) Prior Publication Data

US 2013/0276444 A1    Oct. 24, 2013

Related U.S. Application Data

(63) Continuation-in-part of application No. PCT/EP2011/005308, filed on Oct. 21, 2011.

(30) Foreign Application Priority Data

Nov. 18, 2010    (DE) .......................... 10 2010 051 777

(51) Int. Cl.
*F02D 23/00* (2006.01)
*F01D 17/12* (2006.01)
(Continued)

(52) U.S. Cl.
CPC ............... *F02C 7/00* (2013.01); *F01D 17/141* (2013.01); *F01D 17/167* (2013.01); *F05D 2220/40* (2013.01)

(58) Field of Classification Search
CPC ....... F01D 9/026; F01D 25/26; F01D 17/143; F01D 17/14; F01D 17/141; F01D 17/165; F01D 17/167; F05D 2220/40; F02B 37/025; F02B 37/22; F02M 25/0707; Y02T 10/144

USPC ......... 60/602, 605.2; 415/192, 205, 151, 202, 415/206
See application file for complete search history.

(56) References Cited

U.S. PATENT DOCUMENTS 3,137,477 A * 6/1964 Kofink ........................... 415/166
4,177,005 A * 12/1979 Bozung et al. ................ 415/128
(Continued)

FOREIGN PATENT DOCUMENTS

DE    820 429           7/1948
DE    42 42 494 C1 *    9/1993    .............. F01D 17/18
(Continued)

OTHER PUBLICATIONS

Translation Description DE 42 42 494 C1, published on Sep. 9, 1993, entire document.*
(Continued)

*Primary Examiner* — Thai Ba Trieu
*Assistant Examiner* — Jason T Newton
(74) *Attorney, Agent, or Firm* — Klaus J. Bach

(57) ABSTRACT

In a turbine for an exhaust gas turbocharger of an internal combustion engine having a housing part which has a receiving chamber and which comprises a spiral duct through which exhaust gas of the internal combustion engine can flow, the spiral duct having an outlet cross-section via which exhaust gas is directed onto a turbine wheel disposed in the receiving chamber whereby the turbine wheel can be rotated, at least one flow control member is provided which can be moved in the circumferential direction of the receiving chamber and by means of which the flow cross-section can be adjusted, wherein a warp angle of the outer contour region of the wall over which the flow cross-section can be adjusted is smaller than a wrap angle over which the outer contour region thereof extends.

7 Claims, 5 Drawing Sheets

(51) Int. Cl.
  *F02C 7/00* (2006.01)
  *F01D 17/14* (2006.01)
  *F01D 17/16* (2006.01)

(56) References Cited

U.S. PATENT DOCUMENTS

2011/0067397 A1* 3/2011 Hirth et al. .................. 60/602
2013/0047606 A1* 2/2013 Kuhn et al. ................ 60/605.1

FOREIGN PATENT DOCUMENTS

| | | | |
|---|---|---|---|
| DE | 10 2009 012131 A1 * | 9/2010 | ............ F02B 37/22 |
| JP | 08/121184 A | 5/1996 | |
| JP | 2011 149306 A | 8/2011 | |

OTHER PUBLICATIONS

Translation Description DE 10 2009 012131 A1, pubished on Sep. 9, 2010, entire document.*

* cited by examiner

TURBINE FOR AN EXHAUST TURBOCHARGER OF AN INTERNAL COMBUSTION ENGINE

This is a Continuation-In-Part application of pending international patent application PCT/EP2011/005308 filed Oct. 21, 2011 and claiming the priority of German patent application 10 2010 051 777.1 filed Nov. 18, 2010.

BACKGROUND OF THE INVENTION

The invention relates to a turbine for an exhaust turbocharger of an internal combustion engine, which includes a turbine housing with a spiral duct via which exchanges is directed onto a turbine wheel and a blocking.

DE 100 48 237 A1 discloses an internal combustion engine with an exhaust turbocharger and an exhaust gas recirculation device, wherein the turbocharger comprises an exhaust turbine equipped with a variable turbine geometry in the exhaust tract and a compressor in the intake tract of the internal combustion engine, and wherein the exhaust gas recirculation device comprises a recirculation line between the exhaust tract and the intake tract and an adjustable check valve. The internal combustion engine further comprises a control mechanism in which control signals can be generated for adjusting the variable turbine geometry and the check valve depending on the operating status of the internal combustion engine.

The exhaust turbine is configured as a dual flow turbine with two separate inflow channels to the turbine wheel, each channel having an inlet cross-section, wherein the two inflow channels are shielded from one another in a pressure-tight manner. At least one inflow cross-section of an inflow channel to the turbine wheel is alterable by means of the variable turbine geometry. Provision is made of two separate exhaust lines in the exhaust tract, each line connecting a part of the cylinder head outlets of the internal combustion engine to each inflow channel. The recirculation line of the exhaust recirculation device connects exactly one of the two exhaust lines to the intake tract.

DE 25 39 711 discloses a spiral housing for an exhaust turbocharger with a cross-section that is adjustable at least in regions, wherein on the radially inner wall of the spiral housing at least one sliding tongue is provided so as to be movable with respect to this inner wall in the circumferential direction.

DE 10 2008 039 085 A1 discloses an internal combustion engine for a vehicle with an exhaust turbocharger, which comprises a compressor in an intake tract of the internal combustion engine and a turbine in an exhaust tract of the internal combustion engine. The turbine has a turbine housing, which comprises a spiral duct coupled to an exhaust line of the exhaust tract and a turbine wheel, which is arranged inside a receiving chamber of the turbine housing and which can be acted on by exhaust gas from the internal combustion engine fed through the spiral duct for driving a compressor wheel of the compressor. The compressor wheel is connected by a shaft to the turbine wheel for conjoint rotation. The turbine comprises an adjustment mechanism with which a spiral inlet cross-section of the spiral duct and also a nozzle cross-section of the spiral duct leading to the receiving chamber are jointly adjustable.

Because such exhaust turbochargers are a mass-produced article with a continuously increasing number of parts in the context of series production of internal combustion engines, it is desirable to provide an exhaust turbocharger which provides for efficient (i.e., low fuel consumption and low emission) operation of the associated internal combustion engine and which also has high operational reliability with extreme temperature and pressure changes.

It is the object of the invention is thus to provide a turbine for an exhaust gas turbocharger that has high operational reliability and that also enables efficient operation of an internal combustion engine associated with the exhaust turbocharger.

SUMMARY OF THE INVENTION

In a turbine for an exhaust gas turbocharger of an internal combustion engine having a housing part which has a receiving chamber and which comprises a spiral duct through which exhaust gas of the internal combustion engine can flow, the spiral duct having an outlet cross-section via which exhaust gas is directed onto a turbine wheel disposed in the receiving chamber whereby the turbine wheel can be rotated, at least one flow control member is provided which can be moved in the circumferential direction of the receiving chamber and by means of which the flow cross-section can be adjusted, wherein a warp angle of the outer contour region of the wall over which the flow cross-section can be adjusted is smaller than a wrap angle over which the outer contour region thereof extends.

Such a turbine for an exhaust turbocharger of an internal combustion engine comprises at least one housing part forming at least one spiral duct through which exhaust from the internal combustion engine can flow and which has an outlet cross-section via which a turbine wheel, which is to be accommodated at least in regions in the receiving chamber, of the turbine can be acted on by the exhaust gas. The turbine further comprises at least one blocking body which can be moved, in particular slid, at least substantially in the circumferential direction of the receiving chamber and by means of which the outlet cross-section can be adjusted. To this end, a wall, which delimits the spiral duct at least in regions, of the housing part has an outer contour region which faces towards the blocking body in the radial direction of the receiving chamber, said outer contour region being configured as a counterpart contour corresponding at least substantially to an outer contour region, which faces towards the outer contour region of the wall of the receiving chamber in the radial direction, of the blocking body, by means of which counterpart contour the outer contour region of the blocking body can be covered at least in regions in the radial direction, in particular towards the outside.

According to the invention provision is made such that a wrap angle, over which the outer contour region of the blocking body extends in the circumferential direction of the receiving chamber is smaller than a wrap angle, over which the outer contour region of the wall extends in the circumferential direction of the receiving chamber, of the outer contour region of the wall. In other words, the angular range over which the outer contour region of the blocking body extends is smaller than the angular range over which the outer contour region of the wall relative to which the blocking body can be moved extends. An adjustment range, especially in an upper throughput range of the turbine, of the blocking body is thus created in which the blocking body is covered in regions or optionally also entirely by the wall in the radial direction, especially towards the outside. The blocking body is configured, for example, in the form of a tongue bypass and is therefore designated as a tongue bypass, which has a tongue tip. The tongue can be covered in regions, or optionally entirely, by the wall and/or by the outer contour region thereof up to the tongue tip in the radial direction.

In spite of this covering, with appropriate configuration of the spiral duct (in particular surfaces of the spiral duct), the blocking body can still define a narrowest flow cross-section of said spiral duct, in particular the narrowest outlet cross-section thereof.

The turbine of the invention thus has a particularly high throughput range and a particularly high throughput spread angle such that the turbine can be operated in a particularly efficient manner and, in particular as a result of the movability of the blocking body and in turn as a result of the adaptability of the outlet cross-section associated therewith, the turbine can be adapted to a plurality of different and dynamically changing operating points of the internal combustion engine. The result is an especially efficient, low fuel consumption operation, with low $CO_2$ emissions, of the internal combustion engine.

Furthermore, the variable turbine of the invention (which is designated as a variable bypass turbine when the blocking body is configured as a tongue-shaped bypass) is not only highly efficient but is also simpler in design and has a small number of parts, in particular compared to variable blade turbines. Thus low costs for the turbine of the invention and high operational reliability go hand in hand. In spite of its relatively simple design, the turbine of the invention has the desired throughput spread angle, wherein the quotient $$\frac{\Phi_{max}}{\Phi_{min}} > 3$$

or in some cases even >4. In this throughput the spread angle quotient, $\phi_{max}$ represents the maximum possible throughput of the turbine and $\phi_{min}$ represents the minimum possible throughput of the turbine.

The continuous tightening of emission limits, in particular for nitrous oxide and soot emissions, is having considerable impact on exhaust turbochargers for charging internal combustion engines. Hence there are high demands in terms of supplying exhaust turbochargers with charging pressure owing to high EGR (EGR=exhaust gas recirculation) rates that must be achieved in medium load ranges to full load ranges of internal combustion engines. Hence it is necessary to provide a geometrically small turbine in terms of dimensions or proportions for such an exhaust turbocharger, wherein the required high turbine performances are achieved by increasing the ram capacity or by reducing the swallowing capacity of the turbine associated with the internal combustion engine.

Furthermore, an inlet pressure level of the turbine may be raised by the counter-pressure of an exhaust cleaning device, in particular a soot filter, arranged in the flow direction of the exhaust downstream of the turbine, which requires further reduction of the dimensions or proportions of the turbine. This goes hand in hand with the problem that such size reductions generally also reduce efficiency. However, this is necessary in order to satisfy performance requirements of a compressor side of the exhaust turbocharger for providing a desired air-exhaust supply, and in turn for attaining desired torques or desired performances, as well as lower emissions, of the internal combustion engine.

A turbine with the features of the invention can be designed small in terms of its dimensions or proportions and still attain the desired ram performance. High EGR rates are thus achievable. In other words, an especially large volume of exhaust from an exhaust side of the internal combustion engine associated with the turbine can be recirculated to the air side thereof and fed into the intake air of the internal combustion engine, thus lowering the emissions, in particular the nitrous oxide and soot emissions, of the internal combustion engine.

Owing in particular to its efficient adaptability to different operating points of the internal combustion engine, the turbine of the invention also enables operation optimized for efficiency. The turbine of the invention is thus a variable turbine that can be especially well adapted to various operating points of the internal combustion engine. Decisive factors for the high achievable throughput spread angle and the efficiency characteristics of the turbine are the configuration and/or specification of main dimensions of the wall or walls fixed relative to the turbine housing and delimiting the spiral duct, and also the configuration and/or specification of the blocking body, in particular the tongue, said blocking body being arranged downstream of and capable of moving relative to the turbine housing. The simple basic function of the blocking body is the definition (i.e., the delimitation at least in regions) of the narrowest flow cross-section of the spiral duct over as much of the entire adjustment range, in particular the angle adjustment range, of the blocking body as possible in the circumferential direction of the receiving chamber over the circumference thereof, wherein the blocking body is moved over the entire adjustment range by means of, say, an actuator.

The turbine of the invention enables the narrowest flow cross-section, in particular the narrowest outlet cross-section of the spiral duct leading to the receiving chamber to be delimited in regions, in particular at a tip of the blocking body on the one hand and in regions by an area of a fixed wall of the turbine housing on the other hand, wherein the wall region faces towards the receiving chamber. This is advantageously achieved in the main, particularly in the entire adjustment range of the blocking body. This means that the narrowest flow cross-section is not completely defined, i.e., delimited, in the adjustment range (or else only in a small area of the adjustment range) by walls of the spiral duct fixed relative to the turbine housing and forming the spiral duct.

If the narrowest flow cross-section were delimited in an undesirably large area of the adjustment range of the blocking body by walls fixed relative to the turbine housing (rather than at least in regions by the blocking body), this would mean that beyond a certain position (in particular an adjustment angle) of the blocking body in the adjustment range, a further movement of said blocking body would have no influence on a change of the current throughput of the turbine. In other words, a further movement of the blocking body beyond this specific position would not lead to a desired increase of the throughput. With the turbine of the invention, this problem is avoided such that a movement of the blocking body from one position, in particular an adjustment angle, to a different position relative thereto, in particular an adjustment angle, at least substantially always has an impact on a change of the throughput of the turbine. As a result the turbine of the invention has a particularly high throughput spread angle and can be adapted to different and dynamically changing operating points of the internal combustion engine in a particularly flexible manner. This is particularly advantageous when the turbine is used in a car, as internal combustion engines and thus turbines perform in a particularly transient manner in cars.

In the field of turbo-charging an internal combustion engine for a car, the turbine of the invention thus ensures a pleasant and advantageous driving performance, even for an internal combustion engine configured according to the so-called downsizing principle, wherein the internal combustion engine has a relatively small piston displacement but relatively high performances and torques. Obviously the turbine of the invention is also suitable for use in commercial vehicles.

In a particularly advantageous embodiment of the invention, the turbine comprises an additional housing part having at least one inlet opening, which housing part has another receiving chamber which can be exposed to exhaust via the intake opening and in which the first housing part is accommodated and wherein said chamber is fluidly connected to the spiral duct in order to enable a flow of the exhaust from the receiving chamber into the spiral duct. With this additional housing part, exhaust can initially collect in the receiving chamber for a ram induction drive of the turbine and thus of the internal combustion engine associated therewith. The turbine is thus able to satisfy the previously described high performance demands on the compressor side of the exhaust turbocharger. In the receiving chamber functioning as a collection chamber, the exhaust can collect and build up in pressure before flowing through the at least one spiral duct and driving the turbine wheel. The turbine wheel is connected to a shaft for conjoint rotation, to which shaft a compressor wheel of a compressor of the exhaust turbocharger is likewise connected for conjoint rotation.

The first housing part is advantageously an element configured separately from the second housing part and inserted in the other housing part as an inset. The turbine of the invention can thus be economically manufactured and assembled.

In another advantageous embodiment of the invention, the housing part comprising the at least one spiral duct (i.e., the first housing part) comprises at least one other spiral duct through which exhaust from the internal combustion engine can flow, which other spiral duct has an outlet cross-section via which the turbine wheel accommodated in the receiving chamber can be acted on by the exhaust gas. Through both of these at least two spiral ducts, a plurality of segments is presented via which the turbine wheel can be acted on by the exhaust in an efficient manner. This contributes towards the high efficiency and smooth operation of the turbine of the invention.

A corresponding blocking body can also be allocated to the outlet cross-section of the other spiral duct, which blocking body can be moved in the circumferential direction of the receiving chamber over the circumference thereof and by means of which blocking body the outlet cross-section of the other spiral duct can be variably adjusted. Here too provision can advantageously be made such that a wall, which delimits the other spiral duct at least in regions, of the housing part has an outer contour region facing towards the other blocking body in the radial direction of the receiving chamber, which outer contour region is configured as a counterpart contour corresponding at least substantially to an outer contour region of the other blocking body facing towards the outer contour region of the wall of the other spiral duct in the radial direction of the receiving chamber, by means of which counterpart contour the outer contour region of the other blocking body can be covered at least in regions in the radial direction and in particular towards the outside. The wrap angle of the outer contour region of the other blocking body is also advantageously configured smaller than the wrap angle of the outer contour region of the wall of the other spiral duct. The previously described advantages are thus also achievable for the housing part with the at least two spiral ducts.

When the housing part of this embodiment of the invention with the at least two spiral ducts is arranged in the other receiving chamber of the other housing part, the at least two spiral ducts will be supplied with exhaust gas from the common receiving chamber. In other words, the receiving chamber is divided into the at least two spiral ducts in the flow direction of the exhaust gas from the inlet opening of the receiving chamber to the turbine wheel downstream of the inlet opening, thereby providing a particularly advantageous and efficient incident flow to the turbine wheel. Furthermore, the turbine with the housing part having the at least two spiral ducts can also be operated in the ram induction mode, with the advantages associated therewith.

In another advantageous embodiment of the invention, the outlet cross-section is configured so that it narrows in the radial direction of the receiving chamber, in particular from the outside to the inside. In other words, the outlet cross-section narrows in the radial direction towards a rotation axis of the turbine wheel. A particularly large throughput spread angle is thus achieved in the turbine of the invention. This measure also results in a minimization of an absolute radial blocking of the outlet cross-section by the blocking body, wherein a wrap angle of the outer contour region of the blocking body is kept small in relation to the wrap angle of the outer contour region of the wall.

To determine an at least substantially optimum number $N_{TS}$ of spiral ducts, which are also designated as partial spirals, of the housing part, emphasis is advantageously placed on a radial blocking of the blocking body directly correlated with the wrap angle of the wall of the blocking body. In doing so it is advantageous to maintain a relative total blocking V, which is expressed as $$V = N_{TS} \times \phi_{AB,ZS}/(2 \times \pi)$$

[Note: some of the letter designations in the mathematical formulas and expressions are derived from the original German terms.]

and which is at least substantially less than 35% (0.35). The relative total blocking V is given by the number $N_{TS}$ of spiral ducts of the housing part and the wrap angle $\phi_{AB,ZS}$ of the outer contour region of the blocking body, as well as by the constant $\pi$ multiplied by two. A relative total blocking V clearly less than 35% is particularly advantageous.

In another particularly advantageous embodiment of the invention, a reduction of the efficiency of the turbine of the invention, particularly in an uppermost throughput range thereof, can be brought about by adjustment of a so-called trip edge or interference edge for the flow of the exhaust. The turbine of the invention exhibits very high levels of efficiency, especially up to and including upper throughput ranges, wherein the trip edge or interfering edge and the accompanying efficiency reduction for limiting the rotational speed of the turbine represents a substantial point in connection with very good controllability of the turbine and improves the controllability of the turbine of the invention.

A wrap angle of the blocking body, over which the blocking body extends at least substantially in the circumferential direction of the receiving chamber over the circumference thereof, is advantageously configured larger than the wrap angle of the outer contour region of the wall. In other words, the relationship of the wrap angle $\phi_{L,Zunge}$ of the blocking body (Zunge=tongue) to the wrap angle $\phi_{AB,TS}$ of the outer contour region of the wall is expressed as follows:

$$\phi_{L,Zunge} > \phi_{AB,TS}.$$

In at least virtually the entire adjustment range of the blocking body, it is thus possible to achieve a complete opening position in which the maximum outlet cross-section is represented, even with the trip edge or interfering edge situated where the blocking body and/or outer contour region of the blocking body is covered by the wall and/or the outer contour region of the wall and still opening transversely.

The adjustability of a maximum realizable cross-sectional area of the spiral duct or of the outlet cross-section by means of the blocking body serves as a means for influencing a maximum throughput capacity of the turbine of the invention. Along with the appropriate design of the blocking body, this maximum cross-sectional area or the maximum outlet cross-section is also substantially determined by the appropriate design of the spiral duct and in particular the wall, which faces towards the blocking body in the radial direction of the receiving chamber, of the spiral duct.

A key parameter of the design of the spiral duct is the angle of the wall, which faces in the radial direction of the receiving chamber towards the receiving chamber or the blocking body, of the spiral duct, which wall delimits the spiral duct in the circumferential direction. In order to achieve a high throughput capacity of the turbine, this angle is advantageously configured with the greatest possible values, especially in an upper adjustment range of the tongue bypass (blocking body) in order to maximize the cross-sectional area or the outlet cross-section in the opening position of the tongue bypass.

In an advantageous embodiment of the invention, an angle of at least substantially 45° is bounded by a first tangent on a wall facing towards the receiving chamber in the radial direction thereof, by which a spiral inlet cross-section of the spiral duct is delimited on one side, which is delimited on the other side by a wall facing away from the receiving chamber in the radial direction thereof, and by another tangent on a circle outer-circumferentially tangentially circumscribing the wall delimiting the spiral duct, on which tangent an intersection point with the first tangent lies within the circumscribed circle. This gives rise to an entry angle of the flow of the exhaust gas into the spiral duct of at least substantially 45°, which angle can be configured at least substantially constant in the flow direction downstream along the wall.

When the first housing part is accommodated in the other housing part, the other housing part (which is also the one providing the receiving chamber) is configured such that a flow angle of the flow of the exhaust at least substantially corresponds to this entry angle. The other housing part is optionally configured such that a larger flow angle thereto is formed in order that the other housing part may be used for other first housing parts configured as, e.g., insets that enable, e.g., a higher throughput. In summary, the wall, which faces towards the blocking body in the radial direction and delimits the blocking channel towards the circumferential direction, of the spiral duct can bound an angle of at least substantially 45°, wherein this angle can be configured as constant in the flow direction and in the wall. However, this angle may also vary in the flow direction of the exhaust along the wall.

For configuring this angle progression from the opening position to a closing position of the blocking body, in which dosing position a minimum flow cross-section, in particular a minimal outlet cross-section is set, it is advantageous to have an angle progression from a high value to a low value relative thereto on the surface of the spiral duct, i.e., on the surface of the wall delimiting the spiral duct. In the range of the dosing position of the blocking body, surface angles of the wall in a range of, e.g., 10° to 20° inclusive with respect to the circumferential direction are favorable values, which lead to advantageous levels of efficiency and an advantageous ram induction performance of the turbine.

In another embodiment of the invention, provision can be made such that the housing part has at least two spiral ducts, wherein the spiral ducts are configured asymmetric relative to one another. Because the spiral ducts are not configured identical to one another, blade excitations of the turbine wheel caused by wakes over the perimeter of the turbine wheel can be influenced differently and curbed. The spiral channels differ from one another in terms of, for example, their division ratio.

In another embodiment of the invention, the outer contour regions are each configured in the form of arcs, in particular as circular segments. This measure keeps the manufacturing costs down and likewise renders the blocking body very easy to adjust, for example by pivoting it about a rotation axis. If the outer contour regions are configured as circular segments, their respective center points are then advantageously situated on the rotation axis of the turbine wheel, about which axis the blocking body also pivots for the variable adjustment of the outlet cross-section. For example, provision is thus made such that the outer contour region of the blocking body is configured concave and the outer contour region of the wall is configured convex.

Other advantages, features, and details of the invention will emerge from the following description of preferred examples of embodiment and by referring to the drawing. The following features and combinations of features mentioned in the description and/or the features and combinations of features shown only in the figures can not only be used in these particular combinations, but also in other combinations or alone without exceeding the scope of the invention.

BRIEF DESCRIPTION OF THE DRAWINGS

It is shown is in.

DESCRIPTION OF EXEMPLARY EMBODIMENTS

Figure 1:
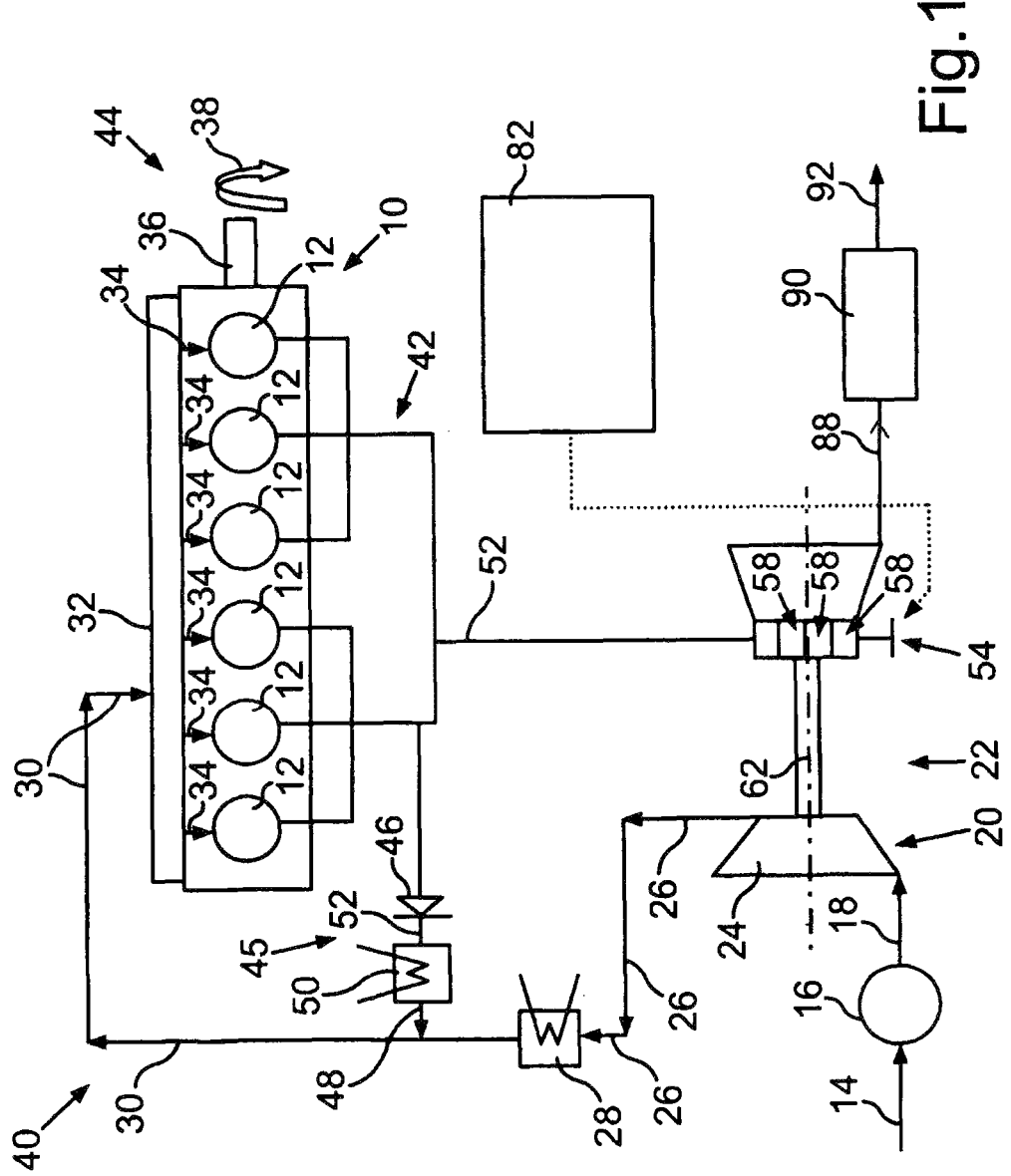
FIG. 1 a schematic diagram of an internal combustion engine, which is charged by means of an exhaust turbocharger comprising a multi-segment bypass turbine, which enables the operation of the internal combustion engine in the ram induction mode.

FIG. 1 shows an internal combustion engine 10 with six cylinders 12. During the operation of the internal combustion engine 10, air is taken in as indicated by the directional arrow 14 and filtered through an air filter 16 and flows in the direction indicated by the arrow 18 into a compressor 20 of a turbocharger 22 associated with the internal combustion engine 10. The air is compressed by the compressor 20 by means of a compressor wheel 24, causing it to heat up. To cool the air thus compressed and thus heated, said air flows in the direction indicated by the arrows 26 to a charge air cooler 28 and further in the direction indicated by the arrows 30 to an air collector 32, via which it is fed in the direction indicated by the arrows 34 to the cylinders 12. In the cylinders 12, the intake and compressed air is exposed to fuel and combusted, bringing about a rotation of a crankshaft 36 of the internal combustion engine 10 in the direction indicated by the arrow 38. Hence the internal combustion engine 10 is a direct injection internal combustion engine such as a gasoline engine, a diesel engine, or a Diesel-Otto (DiesOtto) engine. What has been described thus far and what shall be described in the following, however, is also readily transferrable and applicable to other kinds of internal combustion engines, e.g., engines with manifold injection.

The compressor 20 arranged on an air side 40 of the internal combustion engine 10 serves to provide a desired air supply to the internal combustion engine 10 for achieving a desired performance or torque level of the internal combustion engine 10. The internal combustion engine 10 can thus have a compact design in terms of its piston displacement volume and thus in terms of its dimensions, which goes hand in hand with light weight, high specific performance, low fuel consumption, and low $CO_2$ emissions.

Exhaust of the internal combustion engine 10 produced from the combustion in the cylinders 12 is conducted via exhaust lines 42 to an exhaust side 44 of the internal combustion engine, initially to an exhaust recirculation device 45 by means of which exhaust from the internal combustion engine 10 can be recirculated from the exhaust gas side 44 to the air side 40. To this end, the exhaust recirculation device 45 comprises an exhaust recirculation valve 46 by means of which a specified quantity of exhaust to be recirculated can be set, said quantity of exhaust being adapted to an existing operating point of the internal combustion engine 10. The exhaust flows in the direction indicated by an arrow 52 to an exhaust recirculation cooler 50, which cools the exhaust before it is fed in the direction indicated by the arrow 48 into the intake air by the internal combustion engine 10. This exposure of the intake air to the recirculated exhaust leads to a reduction of emissions, especially of nitrous oxide and particle emissions of the internal combustion engine 10 such that the latter not only exhibits low fuel consumption and high performance but also low emissions.

Furthermore, the exhaust can be conducted by means of the exhaust lines 42 to a turbine 54 of the exhaust turbocharger 22, said turbine 54 being configured as a so-called single flow multi-segment bypass turbine, which is explained with reference to FIG. 2. The turbine 54 comprises a first housing part 56, which has three spiral ducts 58 through which exhaust from the internal combustion engine 10 flows. The spiral ducts 58 have respective spiral inlet cross-sections $A_S$ as well as nozzle cross-sections $A_R$. A turbine wheel 60, which is to be accommodated in the housing part 56, of the turbine 54 is rotatable about a rotation axis 62.

The exhaust of the internal combustion engine 10 now enters the spiral ducts 58 via the respective spiral inlet cross-sections $A_S$ and flows via the respective nozzle cross-sections A to the turbine wheel 60, whereby the turbine wheel 60 is driven by the exhaust and turns. The turbine wheel 60 is connected to a shaft 62' of the exhaust turbocharger for conjoint rotation, to which shaft the compressor wheel 24 is also connected for conjoint rotation, whereby the compressor wheel 24 can be driven by the shaft 62' of the turbine wheel 60.

The turbine 54 also comprises an adjustment mechanism 64, which in turn comprises an adjustment ring 66 connected to three blocking bodies in the form of tongue bypasses 68, one bypass 68 being allocated to each spiral duct 58. The adjustment ring 66 can be turned in the direction indicated by the arrows 70 about the rotation axis 62 of the turbine wheel 60, whereby the spiral inlet cross-sections $A_S$ as well as the nozzle cross-sections $A_R$ evenly spaced in the circumferential direction of the turbine wheel 60 around the circumference thereof can be adjusted. In other words, this means that by turning the adjustment ring 66, the bypasses 68 can be adjusted between at least one position that narrows or even doses the nozzle cross-sections $A_R$ and at least one position that unblocks the nozzle cross-sections $A_R$. A variability of the turbine 54 is thus enabled by the adjustment ring 64, whereby the turbine 54 can be adapted to various operating points in at least virtually the entire characteristic field of the internal combustion engine 10, thus enabling the internal combustion engine 10 to operate in an efficient manner with low fuel consumption and low emissions. The ram induction performance and/or the throughput performance of the turbine 54 can be variably adjusted by adjusting the nozzle cross-sections $A_R$ By means of the spiral ducts 58, which form a plurality of segments of the turbine 54, the internal combustion engine 10 can be operated in the ram induction mode. To enable the operation of the internal combustion engine 10 in the ram induction mode, the turbine 54 comprises a collector housing 72 with which a common collection chamber 74 for the spiral ducts 58 is formed, which chamber is sealed from the surroundings in a gas-tight manner by the collector housing 72, wherein the collector housing 72 can surround the housing part 56 on the sides of a bearing mechanism and hence on a side facing towards the compressor wheel 24 and/or on a side opposite this side, i.e., on the sides of a turbine outlet. The collector housing 72 has an inlet duct 76 into which exhaust can flow via the exhaust lines 42 in the direction indicated by an arrow 78 and which conducts the exhaust into the collection chamber 74. As can be discerned in FIG. 2, the inlet duct 76 narrows in the flow direction of the exhaust indicated by the arrow 78. The exhaust conducted via the inlet duct 76 into the collection chamber 74 is first collected in the collection chamber 74 and can then flow through the spiral ducts 58 to the turbine wheel 60. A mixing as well as a collection of the exhaust thus takes place in the direction of the exhaust flow through the exhaust lines 42 upstream of the housing part 56.

Upstream of the respective spiral outlet cross-sections $A_S$, the spiral ducts 58 each have an at least substantially trumpet-shaped inlet duct 80, via which the exhaust can enter the spiral ducts 58. The turbine 54 exhibits a high level of variability, with which different ram induction performances and thus different EGR rates are achievable. This also enables the provision of a specific air supply to the internal combustion engine 10 for satisfying high performance or high torque requirements. The turbine 54 further comprises only a small number of parts, which goes hand in hand with low costs and a high level of operational reliability.

In principle it is also possible to produce dual flow turbines along the lines of the embodiment of the turbine 54, wherein another housing part with at least two spiral ducts in the form of, for example, the housing part 56 is arranged along the rotation axis 62 of the turbine wheel 60 next to the housing part 56, which other housing part is accommodated in another receiving chamber similar to the receiving chamber 74 and formed by another housing part similar to the collector housing 72. The collection chambers are thus aligned parallel to one another and are separated from one another in a gas-tight manner. In this case provision is made of two housing parts 56 arranged parallel to one another, which each have a certain blocking effect and, by means of, say, a manifold part, also effect a certain ram-charging of the two collection chambers, which are gas tight relative to one another, for separate cylinder groups of the cylinders 12 of the internal combustion engine 10. A variable quasi-dual flow turbine with an adjustment mechanism on both sides similar to the adjustment mechanism 64 and corresponding bypasses 68 is thus represented. Depending on the intended use, an asymmetric ram induction performance is also achievable with this turbine.

The adjustment mechanism 64 of the turbine 54 is controlled or governed by a control mechanism 82 of the internal combustion engine 10, which adjusts the adjustment mechanism 64 so as to adapt the turbine 54 to a prevailing operating point of the internal combustion engine 10.

After acting on and driving the turbine wheel 60, the exhaust flows via the turbine outlet in the direction indicated by the arrow 88 out of the turbine 54 and flows through an exhaust after-treatment device 90, which comprises, for example, a catalytic converter, in particular a nitrous oxide catalyst, and optionally a particle filter, after which the cleaned exhaust is discharged into the environment as indicated by the arrow 92.

Figure 2:
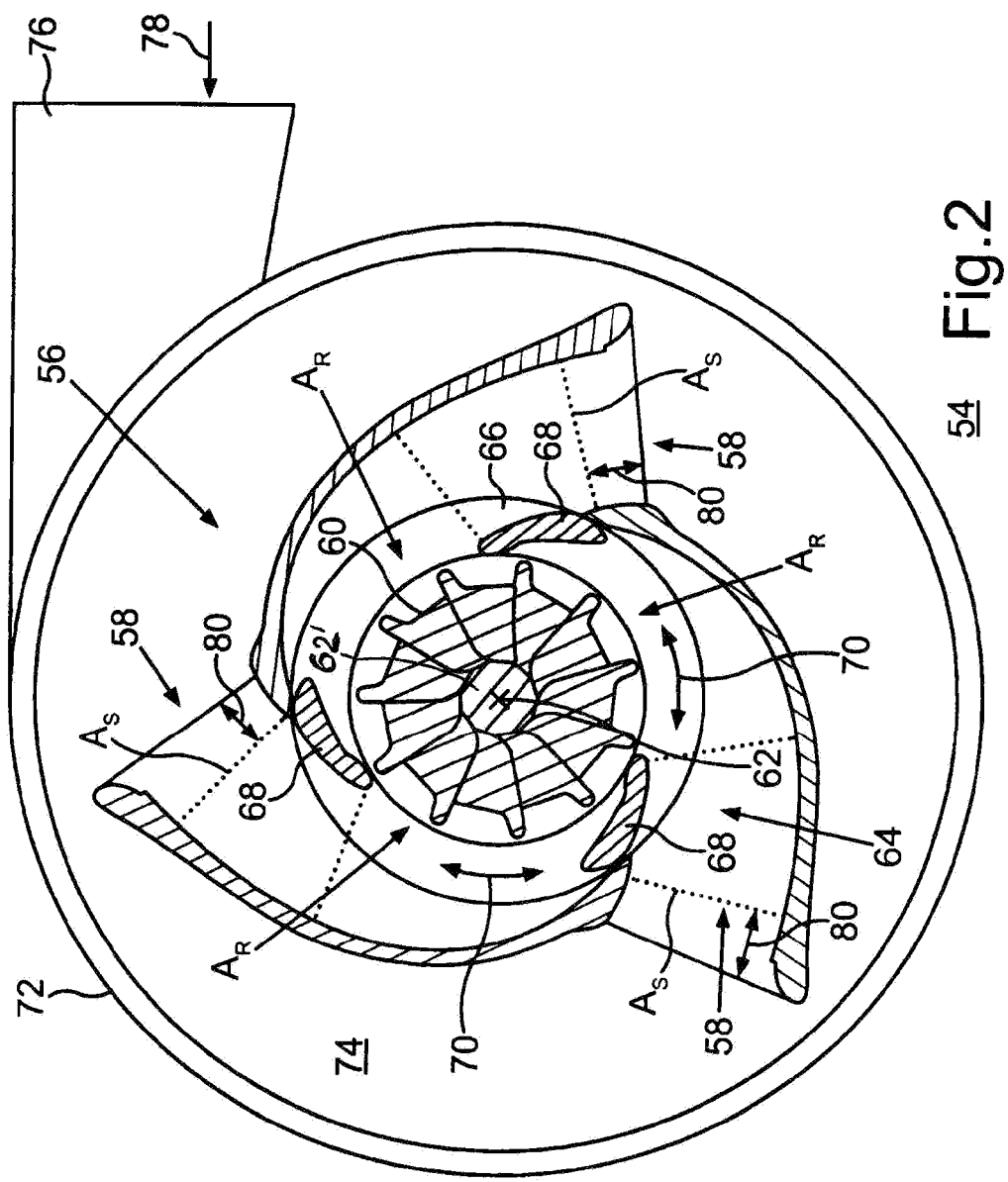
FIG. 2 a schematic cross-sectional view of the multi-segment bypass turbine according to FIG. 1.
Figure 3:
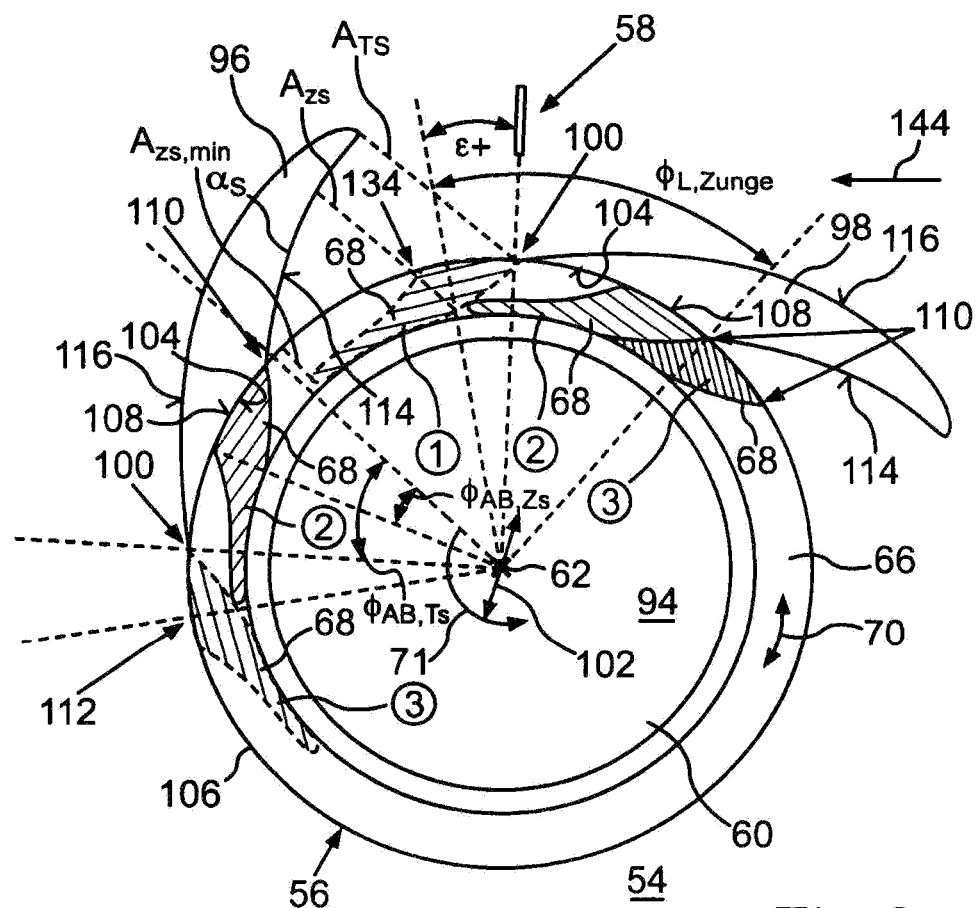
FIG. 3 a schematic cross-sectional view in sections of another embodiment of the multi-segment bypass turbine according to FIG. 2.

FIG. 3 shows an alternative embodiment of the turbine 54 according to FIG. 2, wherein the turbine 54 according to FIG. 3 can also be used with the internal combustion engine 10. In FIG. 3 the turbine wheel 60 is shown highly schematically for a better overview. The turbine wheel 60 of the turbine 54 according to FIG. 3 is likewise accommodated in a receiving chamber 94 of the housing part 56 such that it is capable of rotating about the rotation axis 62 in a rotation direction indicated by the arrow 71.

FIG. 3 shows a spiral duct 58 of the housing 56 through which duct the exhaust from the internal combustion engine 10 can flow and via which the exhaust can flow into the receiving chamber 94 so that it can act on the turbine wheel 60. It is obvious that a plurality of spiral ducts can be distributed similarly to the control duct 58 in the circumferential direction of the turbine wheel 60 over the circumference thereof, as indicated by the arrow 70, wherein the spiral ducts 58 can be configured identical, i.e., symmetric to one another or configured asymmetric to one another.

Figure 4:
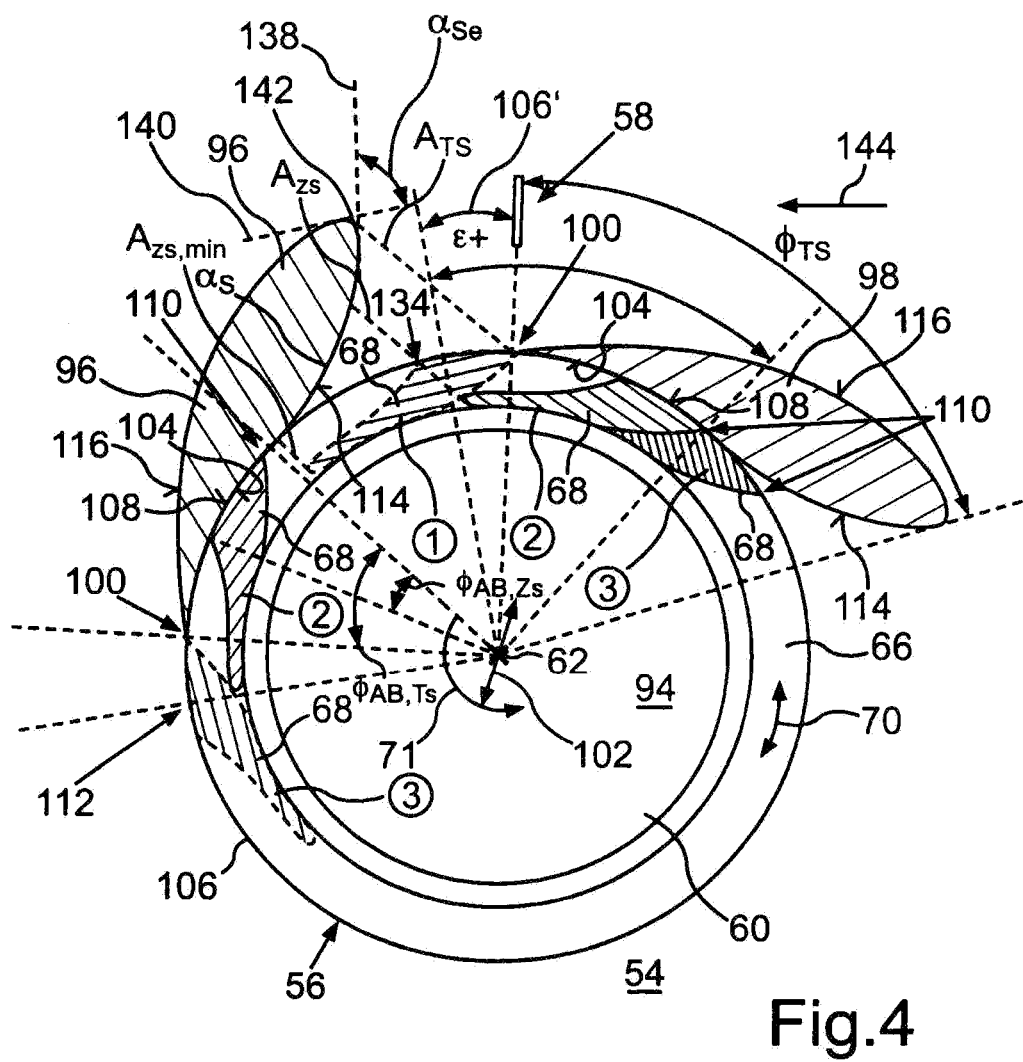
FIG. 4 a schematic cross-sectional view in sections of another embodiment of the multi-segment bypass turbine according to FIG. 3.

As can be discerned in FIG. 3, the turbine 54 according to FIG. 3 differs from the turbine 54 according to FIG. 2 in particular in terms of the configuration of the walls 96 and 98 delimiting the spiral duct 58 and in terms of the configuration of the flow control members 68. FIG. 4 shows a wrap angle $\phi_{TS}$ over which the wall 96 and/or the walls 98 extends/extend in the circumferential direction of the receiving chamber 94 over the circumference thereof. FIG. 3 shows three different positions 1, 2, and 3 of the flow control members 68, wherein different adjustment angles ε are set for moving the bypasses 68 into different positions such as positions 1, 2, and 3. For example, from a tip 100 of the wall 98, the adjustment angle ε of the bypasses 68 increases as the flow control member 68 rotates in the direction of the rotation of the turbine wheel 60 indicated by the arrow 71.

The walls 96 and 98 delimiting the spiral duct 58 in regions each have an outer contour region 104 facing towards the respective flow control member 68 in the radial direction of the receiving chamber indicated by the arrow 102, which contour region is at least substantially configured in the form of a circular segment and designated as a cylinder segment. This is the case where (as shown in FIG. 3) a circle 106 tangent to the outer contour regions 104 can be circumscribed around a center point indicated by the arrow 70 situated on the rotation axis 62. In other words, the outer contour regions 104 are circular segments of the circumscribed circle 106 with the center point situated on the rotation axis 62. The outer contour regions 104 are configured concave.

Similarly, the flow control members 68 each also have an outer contour region 108 facing towards the respective outer contour region 104 of the walls 96 and 98 in the radial direction of the receiving chamber 94 as indicated by the arrow 102. The outer contour regions 108 are also configured, at least substantially, in the form of circular segments and are likewise designated as cylinder segments. The outer contour regions 108 also represent circular segments of the circumscribed circle 106. Hence the outer contour regions 104 are configured as counterpart contours that correspond to, and are in particular at least substantially complementary to the respective outer contour regions 108, wherein the outer contour regions 108 of the flow control members 68 can be covered, at least in regions, in the radial direction indicated by the arrow 102 by said counterpart contours.

FIG. 3 shows a wrap angle $\phi_{AB,ZS}$ of the outer contour region 108 of the flow control members 68 and also a wrap angle $\phi_{AB,TS}$ of the outer contour region 104 of the wall 96 (or 98). For a better overview the wrap angles $\phi_{AB,ZS}$ and $\phi_{AB,TS}$ are illustrated with reference only to one of the bypasses 68 and with reference only to the wall 96. Obviously what is described with reference to the flow control member 68 and with reference to the wall 96 applies similarly to the other flow control member 68 and to the wall 98, as well as to other walls of the housing part 56. The wrap angle $\phi_{AB,ZS}$ of the outer contour region 108 is configured smaller than the wrap angle φAB,TS of the outer contour region 104 of the wall 96 (or 98), thus giving rise to an adjustment angle range of the bypasses 68 in an upper throughput range of the turbine 54, wherein the bypasses 68, which extend over a wrap angle $\phi_{L,Zunge}$ shown in FIG. 3 are covered partially or optionally entirely towards the outside from a rear edge 110 to a tip 112 of the flow control member 68 partially or optionally entirely in the radial direction indicated by the arrow 102 by the outer contour region 104 of the walls 96 and 98 fixed relative to the housing part 56 and to the housing part 72, but are still able to determine, at least to a large extent, the narrowest flow cross-section of the turbine 54 if the surfaces and thus the outer contours of the walls are appropriately configured.

It is advantageous if the narrowest flow cross-section of the turbine 54 is defined by the flow control members 68, at least in regions, over at least virtually the entire adjustment angle range of the flow control members 68, over which range the flow control members 68 can be moved from a first end position to another end position. The narrowest flow cross-section should thus be delimited, at least to a large extent, over the entire adjustment angle range between the tip 112 of the movable bypasses 68 and the outer contour region 114 of the walls 96 and 98. The outer contour region 114, which for a better overview is illustrated only with reference to the wall 96 in FIG. 3, thus delimits the outside of the spiral duct 58 in the radial direction and faces in the radial direction towards the receiving chamber 94 or the flow control members 68, as opposed to an outer contour region 116 of the wall 96 (or 98), which faces away from the receiving chamber 94 or the flow control member 68.

Figures 5, 6:
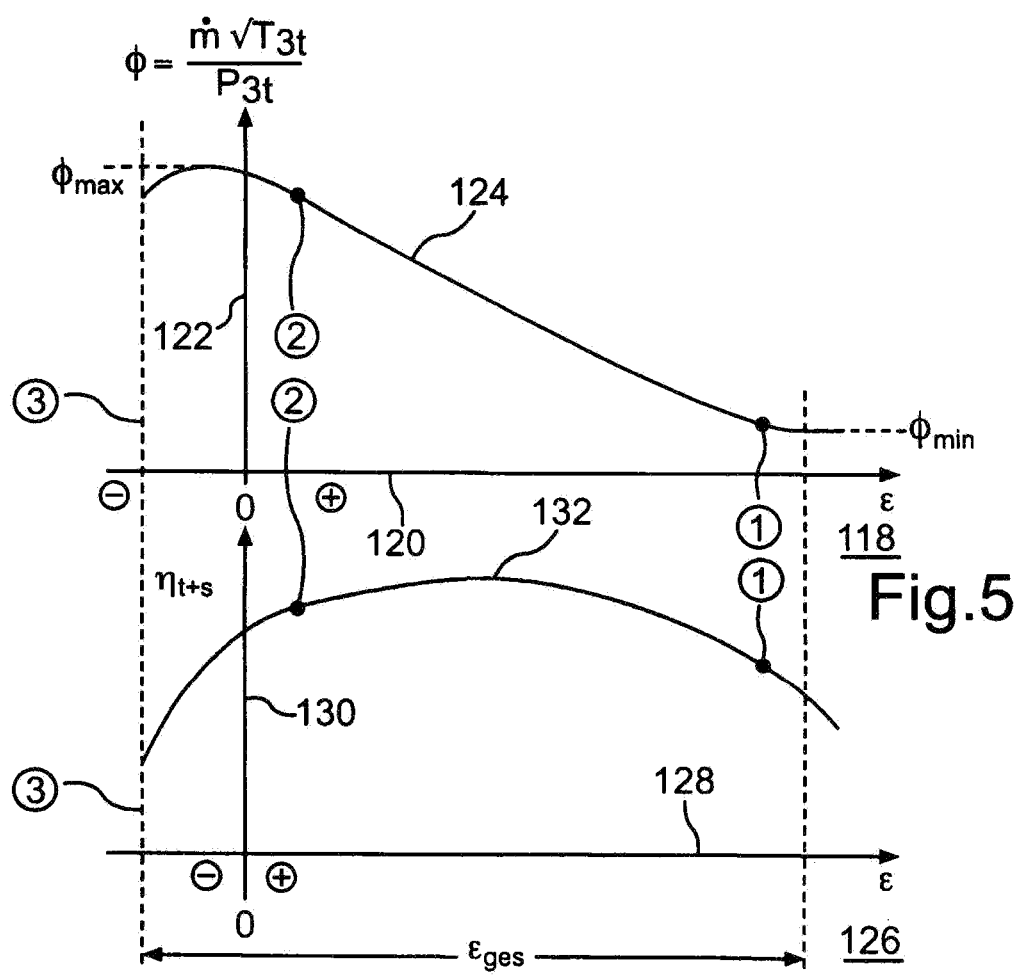
FIG. 5 a diagram representing a throughput progression of multi-segment bypass turbine according to FIGS. 3 and 4 over an adjustment angle range of the bypass (blocking body)
FIG. 6 a diagram representing a progression of the level of efficacy of the multi-segment bypass turbine according to FIG. 5 over an adjustment angle range of the bypass.

With reference to both FIGS. 5 and 6, it can be discerned that the bypasses 68 in position 1 give rise to at least virtually the smallest throughput parameter $\phi_{min}$ in that they set at least virtually the smallest flow cross-section $A_{ZS,min}$ between their tips 112 and the outer contour region 114.

What is not desired is for the tip 100, which is immobile relative to the housing part 56, to form the narrowest flow cross-section of the turbine 54 beyond a certain adjustment angle ε of the flow control members 68, whereby the throughput spread angle of the turbine 54 or the function of the flow control members 68 beyond this respective adjustment angle ε would no longer have any effect on a desired throughput increase of the turbine 54 if this adjustment angle ε were reduced any further. In other words, if this respective adjustment angle ε is situated in the adjustment angle range undesirably far ahead of one of the end positions to which the flow control members 68 can be set for providing the largest flow cross-section, the flow control members 68 can then be moved undesirably far from this respective adjustment angle ε to the end position, and this movement would no longer have an effect on a throughput increase since the narrowest flow cross-section would then be formed by the fixed walls 96 and 98. Such a flow cross-section is designated with $A_{TS}$ in FIG. 3.

The turbine 54 of FIG. 3 enables the narrowest flow cross-section of the turbine 54 to be delimited in regions at least virtually in the entire adjustment angle range of the flow control members 68 or allows the adjustment angle ε from which the narrowest flow cross-section of the turbine 54 is formed by the fixed walls 96 and 98 to be situated particularly close to the end position of the flow control member 68, wherein the end position is, for example, the position 3 shown in FIG. 3 in which the smallest possible adjustment angle ε of the flow control members 68 is set.

This can also be discerned by referring to FIGS. 5 and 6. FIG. 5 shows a diagram 118 in which the adjustment angle ε of the flow control members 68 is plotted on the abscissa 120 and in which the throughput parameter φ is plotted on the ordinate 122. The throughput parameter φ is calculated from the mass flow of the exhaust flowing through the turbine 54 and from the temperature $T_{3l}$ and the pressure $p_{3l}$ in the flow direction of the exhaust ahead of (upstream of) the turbine, wherein the turbine pressure ratio $\pi_{t-s}$ is constant.

Moving the flow control members 68 over their entire adjustment angle range $\epsilon_{ges}$ from one end position into the other end position gives rise to the progression 124 of the throughput parameter φ illustrated in diagram 118. The maximum possible and settable throughput parameter $\phi_{max}$ and the smallest possible throughput parameter $\phi_{min}$ of the turbine 54 are shown in diagram 118. One of these end positions of the flow control members 68 is position 3, in which a negative adjustment angle ε is set relative to the tip 100 of the wall 98. As follows from diagram 118, the maximum throughput parameter $\phi_{min}$ is situated especially close to and ahead of (end) position 3 when the latter is set. As can also be inferred from FIG. 5, the smallest possible throughput parameter $\phi_{min}$ can be set by moving the flow control members 68 into the other end position, wherein the smallest possible throughput parameter $\phi_{min}$ is still situated within the adjustment angle range $\epsilon_{ges}$. This means that the throughput parameter φ can be influenced in virtually the entire adjustment angle range $\epsilon_{ges}$, ideally in the entire adjustment angle range $\epsilon_{ges}$, by moving the flow control members 68. The turbine 54 can thus be adapted especially well to different operating points of the internal combustion engine 10.

As follows from FIG. 5, there is a relatively high level of efficiency $\eta_{t-s}$ in position 1 of the flow control members 68, in which position at least virtually the smallest flow cross-section $A_{ZS,min}$ is set. In position 2 of the flow control members 68, in which a comparatively greater flow cross-section $A_{ZS}$ is set, there is a comparatively higher level of efficiency $\eta_{t-s}$. In position 3 of the flow control members 68, in which there is also a relatively large flow cross-section compared to position 1, there is a lower level of efficiency $\eta_{t-s}$ of the turbine 54 compared to positions 1 and 2.

FIG. 6 shows another diagram 126, in which the adjustment angle range ε is plotted on the abscissa 128. The efficiency $\eta_{t-s}$ of the turbine 54 is plotted on the abscissa 130 of diagram 126. Adjusting the flow control members 68 in their adjustment angle range $\epsilon_{gss}$ gives rise to a progression 132 of the efficiency $\eta_{t-s}$. As in diagram 118, positions 1, 2, and 3 of the bypasses 68 are also plotted in diagram 126 and the associated throughput parameters φ or efficiency levels $\eta_{t-s}$ can be discerned.

From position 2 of the flow control members 68 on, a further increase of the throughput range can be effected by further reduction of the adjustment angle ε if a movable or adjustable ring nozzle 134 of the spiral duct 58 (or of the spiral ducts 58) via which the exhaust flows into the receiving chamber 94 narrows in the radial direction indicated by the arrow 102 towards the rotation axis 62, at least in terms of its width, i.e., its extension in the circumferential direction of the receiving chamber 94 according to the arrow 70, over the circumference thereof.

The Flow control members 68 have, in relation to the rotation direction indicated by the arrow 71, a rear edge 110 opposite the tip 112, which edge is also designated as a trip edge or interference edge and which enables an efficiency reduction in the uppermost throughput range beyond position 2 in the direction of position 3. The turbine 54 configured as a bypass turbine exhibits a high level of efficiency $\eta_{t-s}$ up into the upper throughput range, wherein the edge 110 provides an efficiency reduction representing a safety option for limiting the speed of the turbine 54 and also represents a substantial point associated with the excellent controllability of the turbine 54.

The relationship of the wrap angle $\phi_{L,Zunge}$ to the wrap angle $\phi_{AB,TS}$ is expressed as follows:

$$\phi_{L,Zunge} > \phi_{AB,TS}.$$

It is thus possible to achieve a complete opening position of the control members 68 (position 3) in at least virtually the entire adjustment angle range $\epsilon_{ges}$, even with the edge 110 situated where the control members 68 is covered by the wall 96 (or by the wall 98) and is still opening transversely (position 3).

If the adjustment angle ε is increased further past position 1, the movable control members or the movable control member 68 become(s) situated to an increasingly greater extent in the outlet region of the spiral duct 58 (in the nozzle 134) and, as a throttle element, lead(s) to a greater loss creation, wherein there may be a slight increase in the turbine throughput capacity with respect to the minimum throughput parameter $\phi_{min}$ due to an unblocking of the cross-section in the direction of the bypasses 68. In general the adjustment angle range here is limited to the position of the minimum throughput parameter $\phi_{min}$ for the option of a maximum possible pressure buildup of the turbine 54.

As follows from the previous descriptions, the maximum throughput capacity of the turbine 54 is influenced by setting the maximum possible flow cross-section $A_{ZS}$. Along with the configuration of the control members 68, the flow cross-section $A_{ZS}$ or the corresponding cross-sectional area is determined by the configuration of the spiral ducts 58 and in particular by the configuration of the outer contour region 114. A key parameter for the configuration of the spiral duct 58 or spiral ducts 58 is an angle $\alpha_S$ (shown in FIG. 3) of the outer contour region 114 of the wall 96 (or of the wall 98) delimiting the spiral duct 58 radially on the outside towards the circumferential direction according to the arrow 70. In other words, the angle $\alpha_S$ is the angle bounded by the outer contour region 114 or the tangents thereon and by the circumscribed circle 106 or the corresponding tangents on the circumscribed circle 106. In order to achieve a particularly high throughput capacity of the turbine 54, the angle $\alpha_S$ is advantageously configured with the greatest possible values in the upper adjustment range of the bypasses 68 in order to maximize the flow cross-section $A_{ZS}$ in the opening position (position 3) of the flow control members 68.

FIG. 4 shows an entry angle $\alpha_{Se}$, which is at least substantially 45°. The angle $\alpha_{Se}$ is bounded by two tangents 138 and 140. The tangent 138 is a tangent on the outer contour region 114 of the wall 96 by which the flow cross-section $A_{TS}$ is delimited in regions and on one side. The flow cross-section $A_{TS}$ is delimited on the other side by the outer contour region 116 of the wall 98. The tangent 140 is a tangent on a circumscribed circle 106', which is concentric to the circumscribed circle 106 and which tangentially surrounds the wall 96 on the outer perimeter in the radial direction. A point of intersection 142 of the tangent 138 with the circumscribed circle 106' lies on the tangent 140.

From this angle $\alpha_{Se}$ and continuing in the flow direction of the exhaust through the spiral channel 58 indicated by a directional arrow 144 along the outer contour region 114 of the wall 96, the entry angle $\alpha_{Se}$ (which can also be other than a 45° angle) remains at least substantially constant, whereas it varies in the wall 96 according to FIG. 4.

The housing part 72 surrounding the spiral ducts 58 is advantageously configured and dimensioned such that a flow angle of the exhaust at least substantially corresponds to the entry angle $\alpha_{Se}$ or optionally larger flow angles of the exhaust are achieved in order that housing parts 56 with greater throughput may be used with the collector housing 72.

For configuring the progression of the angle $\alpha_S$ from the entry angle $\alpha_{Se}$ of the opening position of the flow control members 68 to the closing position, on the outer contour region 114 it is advantageous to have an angle progression from a high value to a low value in the flow direction of the exhaust, as can be discerned from the outer contour region 114 according to FIG. 4. In the range of position 1 (the dosing position) of the bypasses 68, angles $\alpha_S$ of the outer contour region 114 ranging from, e.g., 10° to 20° inclusive in the circumferential direction result in favorable efficiency ($\eta_{t\text{-}s}$) of the turbine 54.

What is claimed is:

1. A turbine (54) for an exhaust turbocharger (22) of an internal combustion engine (10) comprising:
   a turbine housing part (56) with a receiving chamber (94);
   at least one spiral duct (58) through which exhaust gas from the internal combustion engine (10) is conducted;
      wherein said at least one spiral duct (58) including an outlet flow cross-section ($A_{zs}$) via which a turbine wheel (60), which is accommodated in the receiving chamber (94) of the turbine housing part (56), is acted on by the exhaust gas;
   a flow control member (68) which is movable in a circumferential direction (70) of the receiving chamber (94) and by which the outlet flow cross-section ($A_{zs}$) to the turbine wheel (60) is adjustable; and
   a wall (96, 98) delimiting the at least one spiral duct (58) in the turbine housing part (56) and having an outer wall contour region (104) which faces towards the flow control member (68) in a radial direction (102) of the receiving chamber (94);
      wherein said outer wall contour region (104) has a counterpart contour which corresponds to an outer flow control member contour region (108), which faces towards said outer wall contour region (104) in the radial direction (102) of the flow control member (68);
      wherein the outer flow control member contour region (108) of the flow control member (68) is covered by the counterpart contour at least in regions in the radial direction (102); and
      wherein the outer flow control member contour region (108) of the flow control member (68) has/includes a wrap angle ($\phi_{AB,ZS}$);
         over which the outer flow control member contour region (108) thereof extends over the circumference of the receiving chamber (94) in the circumferential direction (70) thereof, and which is smaller than a wrap angle ($\phi_{AB,TS}$) of the outer wall contour region (104) of the wall,
         over which the outer wall contour region (104) thereof extends over the circumference of the receiving chamber (94) in the circumferential direction (70) thereof, the wall forming an angle ($\alpha_{se}$) of at least 45 degrees which is bounded by a first tangent (138) on a region of the wall (114) which faces towards the receiving chamber (94) in the radial direction (102) thereof; and
         over which the outer wall contour region (104) delimits a spiral inlet cross-section ($A_{TS}$) of the spiral duct (58) on one side which is delimited on the other side by a wall region (116) facing radially away from the receiving chamber (94) and by another tangent (140) on a circle (106') tangentially circumscribing the wall (96, 98) delimiting the spiral channel (58);
            wherein the another tangent an intersection point (142) with the first tangent (138) is disposed with a circumferential distance (106').

2. The turbine (54) according to claim 1, wherein the turbine (54) comprises a collector housing (72), which has at least one inlet opening (76) and which has another receiving chamber (74) exposed exhaust gas via the inlet opening (76) in which the turbine housing part (56) is accommodated and which is fluid connected to the at least one spiral duct (58) to enable the exhaust to flow from the other receiving chamber (74) into the at least one spiral duct (58).

3. The turbine (54) according to claim 2,
   wherein the at least one spiral duct (58) in the turbine housing part (56) comprises a first spiral duct (58) and a second spiral duct (58) through which exhaust gas of the internal combustion engine (10) flows,
      wherein each of said first spiral duct (58) and said second spiral duct (58) have the outlet cross-section ($A_{zs}$) via which the turbine wheel (60) accommodated in the receiving chamber (94) is acted on by the exhaust gas.

4. The turbine (54) according to claim 3, wherein the outlet cross-section (Azs) of the each of said first spiral duct (58) and said second spiral duct (58) narrows from the outside to the inside in the radial direction (102) of the receiving chamber (94).

5. The turbine (54) according to claim 1, wherein a relative total blocking V of the turbine (54) is expressed by:

$$V = (N_{TS} \times \phi_{AB,ZS})/(2\pi), \text{ wherein}$$

V is the relative total blocking of the turbine (54),
$N_{TS}$ is the number of the at least one spiral duct (58) that the turbine housing part (56) comprises,
$\phi_{AB,ZS}$ is the wrap angle ($\phi_{AB,ZS}$) of the outer contour region (108) of the flow control member (68), and
wherein V is at least less than 0.35.

6. The turbine (54) according to claim 1, wherein a wrap angle ($\phi_{L,Zunge}$) of the flow control member (68) extending in the circumferential direction (70) of the receiving chamber (94) is larger than the wrap angle ($\phi_{AB,Ts}$) of the outer wall contour region (104) of the wall (96, 98).

7. The turbine (54) according to claim 1, wherein each of the outer wall contour region (104) and the outer flow control member contour region (108) is in the form of circular segments.

* * * * *